United States Patent [19]

Nakamura et al.

[11] Patent Number: 4,889,480
[45] Date of Patent: Dec. 26, 1989

[54] SLIDE CORE MOLD AND INJECTION MOLDING

[75] Inventors: Susumu Nakamura; Koichi Yokoi, both of Yamanashi, Japan

[73] Assignee: Sankyo Engineering Co., Ltd., Yamanashi, Japan

[21] Appl. No.: 278,855

[22] Filed: Dec. 2, 1988

[51] Int. Cl.$^4$ .............................................. B29C 45/44
[52] U.S. Cl. ................................. 425/577; 425/450.1; 425/451.7; 425/DIG. 58
[58] Field of Search ............ 425/577, DIG. 58, 450.1, 425/451.7

[56] References Cited

U.S. PATENT DOCUMENTS 2,292,593  8/1942  Amigo ................................... 425/577
4,515,342  5/1985  Boskovic ............................... 425/577

Primary Examiner—Jay H. Woo
Assistant Examiner—Timothy W. Heitbrink
Attorney, Agent, or Firm—Colucci & Umans

[57] ABSTRACT

A slide core mold for injection molding wherein a slider block provided in its front surface with an undercut core is slidably provided on the side of a core mold, a pressure receiving inclined surface provided with guide grooves in opposite sides being provided at the back thereof, projections fitted into said guide grooves are provided on opposite sides at a corresponding position of a cavity mold corresponding thereto, a block body formed in its front surface with a pressing inclined surface in contact with the pressure receiving inclined surface of the back of the slider block is projected, and the slider block is reciprocated in association with engagement and disengagement of the core mold and the cavity mold.

4 Claims, 3 Drawing Sheets

SLIDE CORE MOLD AND INJECTION MOLDING

BACKGROUND OF THE INVENTION

1. Field of the Invention

The present invention relates, among molds for injection molding a material such as molten synthetic resins, to a slide core mold for injection molding synthetic resins, in which an undercut core for molding a depression or the like separately from a main molding in a peripheral edge lower portion of a molded article is slidably moved in and out of a side edge of a main core.

2. Description of the Prior Art

Generally, undercut molding for molding a depression and a cut separately from a main molding in a peripheral edge lower portion of a molded article should be performed by protruding an undercut core for molding an undercut portion into a recess of a core mold separately from a core mold which is a main body. Therefore, in the past, a slide core mold provided with a slide mechanism portion has been used in which when a mold is opened to remove a molded article, an undercut-portion molding core protruded into a recess of the molded article can be moved backward in association therewith so as to remove the molded article. In the past, the slide mechanism of the type as described is designed so that an undercut core and a slider block provided with an inclined hole are slidably provided on the side of a core mold, an inclined pin is provided at a corresponding position of a cavity mold corresponding to a position of said inclined hole, the slider block being moved forward and backward while being guided according to a degree of fitting of the inclined pin into the inclined hole.

However, in the conventional slide mechanism using the inclined pin and the inclined hole, the pin is caught so that it may not be fitted into the hole unless the angle of inclination thereof is precisely met the pin and the hole, and therefore, extremely high precision is required. In addition, the steps of manufacturing a mold increases thus making it difficult to manufacture a mold. Moreover, there gives rise to a problem in that where the width of the slider is large, a partial guide merely using two points on opposite sides of the slider is unstable, and therefore, it is necessary to increase the number of guiding inclined pins and to enlarge the diameter of the pin.

SUMMARY OF THE INVENTION

It is an object of the present invention to provide a slide core mold for injection molding which is simple in construction, less in the number of steps of manufacturing a mold, involves no trouble, can be operated positively, and can be freely applied even to a slide core having a large width.

A slide core mold for injection molding according to the present invention employs, in place of the conventional fitting sliding between an inclined pin and an inclined hole which requires a high precision, an inclined-surface sliding which is simple in construction, whereby the sliding is propelled by the joined pressing force thereof.

More specifically, an inclined surface formed with guide grooves in opposite sides thereof is provided in the back of a slider block provided on the side of a core mold, and a block body provided with a projection fitted into the guide groove and an inclined surface is projected at a corresponding position on the side of a cavity fitted into the core mold.

In addition, with respect to the reciprocating sliding of the slider block, a spring is disposed between the slider block and a stroke end so that forward movement thereof is positively effected by the pressing force of the inclined surface whereas the backward movement thereof is positively effected by the restoring force of the spring.

Accordingly, in the slide mechanism portion constructed as described above, the operation of opening and closing the cavity mold and the core mold is accomplished by being converted into a force at right angles to the inclined surface by the action of the inclined surface, and therefore, the pressing force caused by the inclined-surface joining is linked with the positive reciprocation of the slider block.

Moreover, since the shape of the propelling mechanism portion is simple, and therefore the number of steps of manufacturing a slide mechanism portion will suffice to be small, and even if the width of the slider block is large, the stable sliding effect can be secured by a single inclined surface.

DETAILED DESCRIPTION OF THE PREFERRED EMBODIMENTS

Figure 1:
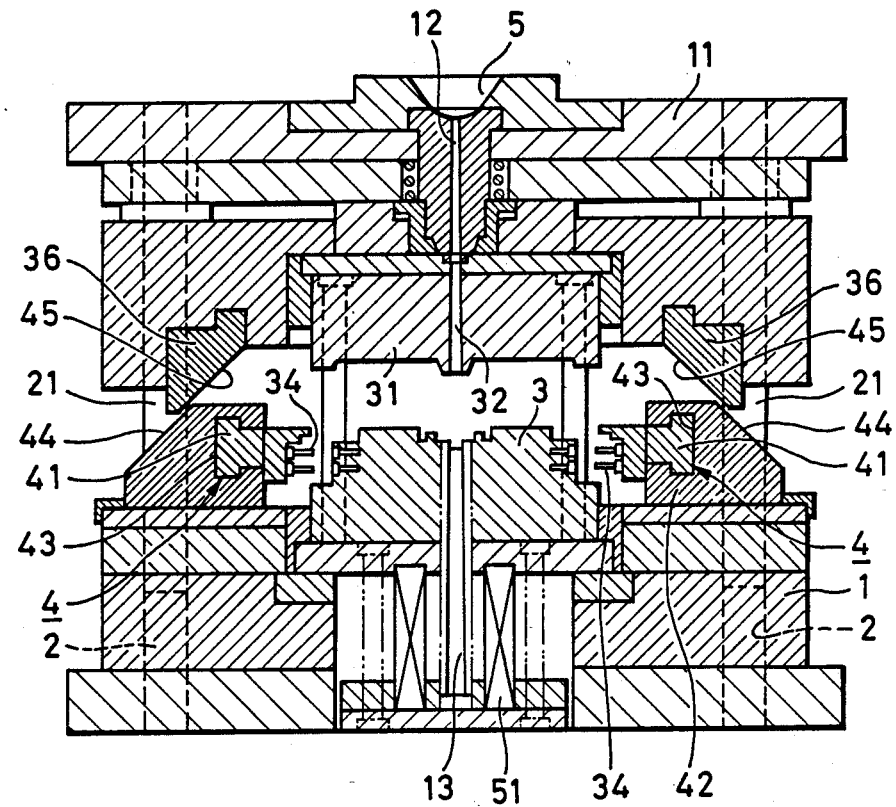
FIG. 1 is a longitudinal sectional side view of a slide core mold for injection molding according to the present invention in its parted state.
Figure 2:
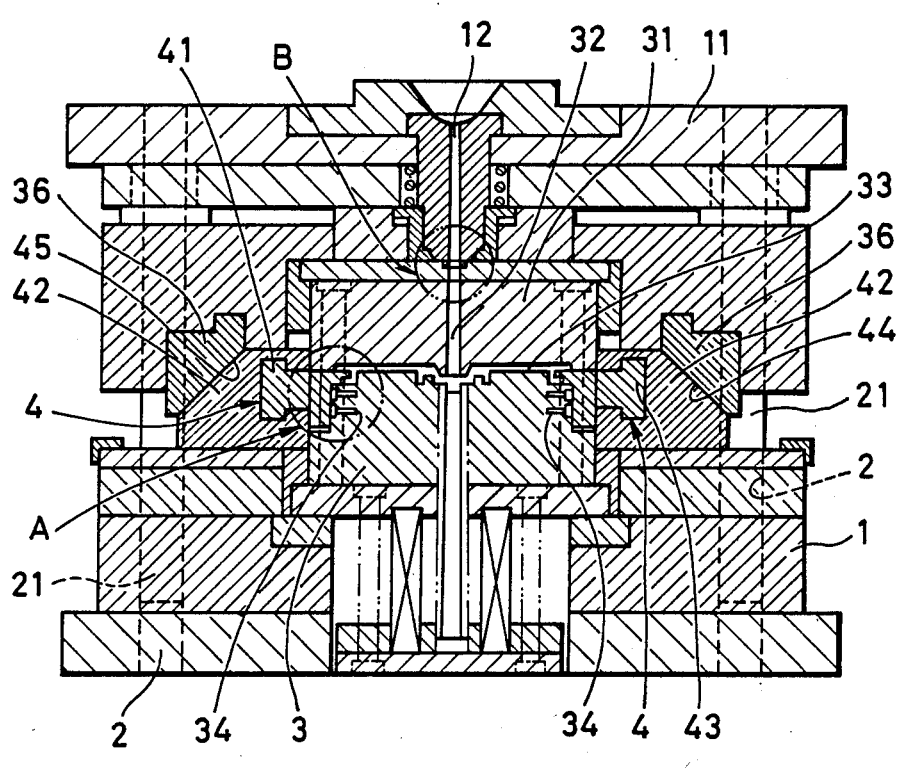
FIG. 2 is a longitudinal sectional side view in the fitted state thereof, FIGS. 2A and 2B respectively being enlarged views of portions A and B.
Figure 2:
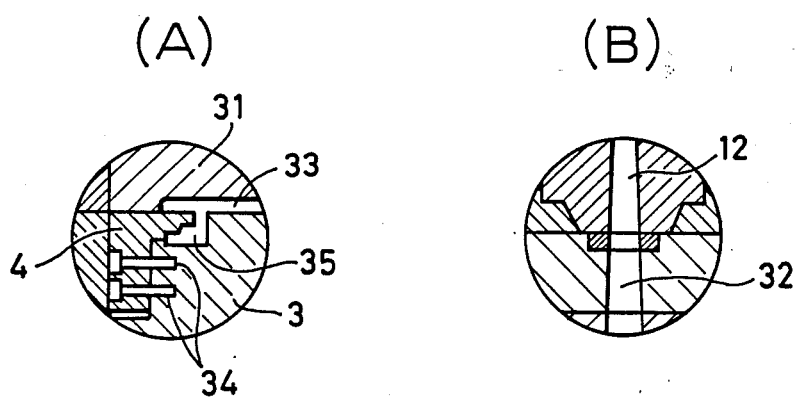
Figure 3:
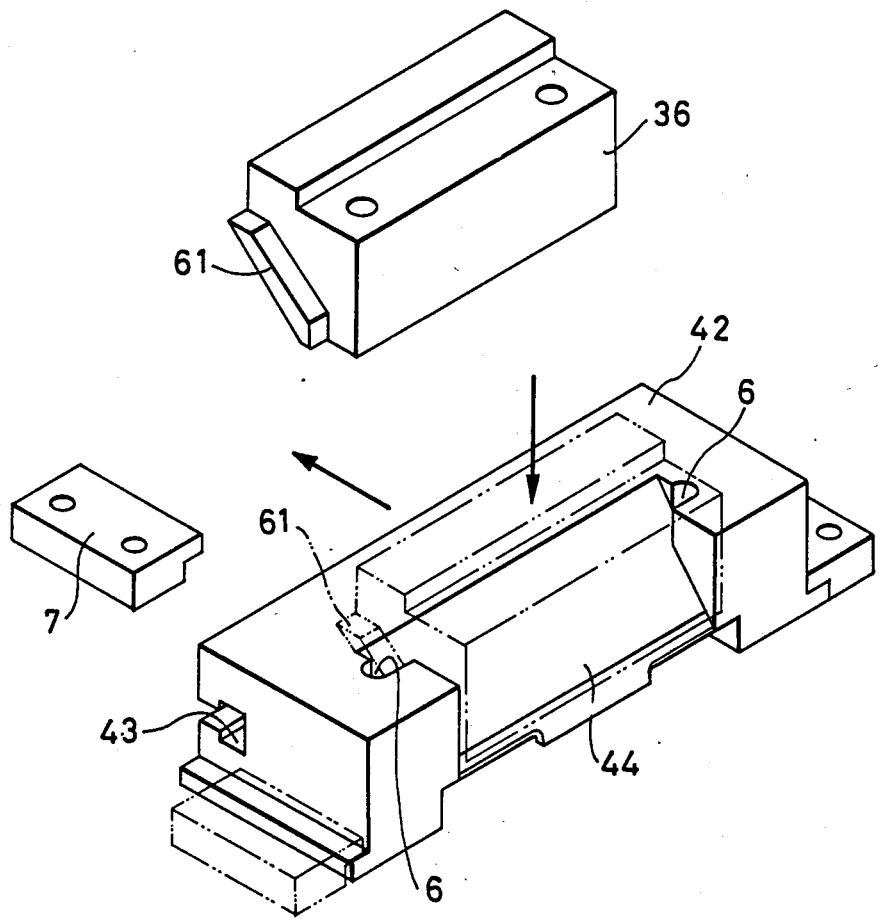
FIG. 3 is a perspective view of a slider block and a projected block body showing the contacting and sliding state of a pressure receiving inclined surface of a slider block with respect to a pressing inclined surface of a projected block body.

An embodiment of the present invention will be described hereinafter with reference to the drawings. Reference numeral 1 designates a core mold locking frame in which a core mold 3 provided with a guide hole 2 in a main end edge and constituting a convex-shaped molded article shape portion is fixedly fastened by a fastening member.

The core mold 3 is formed in its end edge with a fitting portion 41 into which is fitted an undercut core 4 for molding an undercut portion of a molded article, the undercut 4 being fitted into the fitting portion 41 when the core 4 is moved forward.

The rear end of the undercut 4 constitutes a fitting portion 41, and the undercut core 4 is inserted from the side and fitted into a slider block 42 with a slight clearance from an engaging groove 43 provided in the slider block 42, the undercut core 4 being mounted and fitted in the slider block 42.

It is noted that another method can be employed to mount the undercut core 4 on the slider block 42 and that the undercut core 4 may be of course molded integral with the slider block 42.

The slider block 42 is provided with a pressure receiving inclined surface 44 formed at the back thereof and is slidably mounted by a slider guide 7 on the locking frame 1. A pressing inclined surface 45 formed on the front portion of a block body 36 provided on a cavity mold locking frame 11 is pressed in contact with the pressure receiving inclined surface 44 of the slider block 42 so as to effect a reciprocating motion, forward and backward, according to engagement and disengagement of the locking frames 1 and 11 guided by the pressure receiving inclined surface 44 depending on the angle of inclination of the pressing inclined surface 45.

Reference numeral 6 designates guide grooves provided on opposite sides of the pressure receiving inclined surface 44, and guide projections 61 provided on the opposite sides of the pressing inclined surface 45 are fitted therein to guide the operation of the block.

The cavity mold locking frame 11 is provided with a guide pole 21 inserted and fitted into the guide hole 2, and a cavity mold 31 constituting a recess-shape molded article shape portion is fitted into the central portion and fixedly fastened by a fastening member.

Reference numeral 5 designates a nozzle touch of an injection molding machine, and a material injected from a nozzle is filled into the molded article shape cavity 33 and undercut space 35 through an injection hole 12 of the locking frame 11, and an injection hole 32 of a mold 31. Upon completion of molding, a molded article is removed by a pin projected from a projecting pin hole 34.

Since the apparatus of the present invention is constructed as described above, the operating mechanism portion of the slide core is simplified, the number of steps is small which is advantageous in terms of production. The operation is positive with less trouble, and the apparatus can be smoothly applied even to the slide core having a large width.

What is claimed is:

1. A slide core mold comprising: a core mold locking frame (1); a core mold (3) fixed to said core mold locking frame; a cavity mold locking frame (11) mounted for movement toward and away from said core mold locking frame; a cavity mold (31) fixed to said cavity mold locking frame and engageable with said core mold to define a cavity (33) having an undercut space (35) near an edge of said cavity; injection means connected to said cavity and core mold locking frames for injecting material to be molded into said cavity; a first slider block (42) having a front surface facing said core mold and a back surface opposite from said front surface, said first slider block being slidably mounted to said core mold locking frame for movement toward and away from said core mold, said back surface including a pressure receiving inclined surface (44) facing said cavity mold locking frame; an undercut core (4) connected to said first slider block at said front surface thereof, said undercut core having a portion for insertion into said undercut space when said first slider block slides toward said core mold; a first block body (36) connected to said cavity mold locking frame and including a pressing inclined surface (45) engageable with said pressure receiving inclined surface of said first slider block when said cavity and core mold locking frames are moved toward each other, for moving said first slider block toward said core mold; said first slider block including guide grooves (6) therein on opposite sides of said pressure receiving inclined surface and at said back surface of said first slider block; and said first block body including guide projections (61) on opposite sides of said pressing inclined surface for sliding engagement in respective guide grooves (6) of said first slider block, said guide projections and guide grooves being inclined so that with movement together and apart of said cavity and core mold locking frames, said first slider block slides toward and away from said core mold.

2. A slide core mold according to claim 1 wherein said first slider block includes a receiving groove and said undercut core has a fitting portion for engagement into said receiving groove.

3. A slide core mold according to claim 2 wherein said receiving groove extends transversely to a direction of sliding of said first slider block on said core mold locking frame.

4. A slide core mold according to claim 3 including a second slider block and a second block body connected respectively to said core and cavity mold locking frames, and positioned opposite from said first slider block and said first block body respectively.

* * * * *